US006781117B1

(12) United States Patent
Willoughby et al.

(10) Patent No.: US 6,781,117 B1
(45) Date of Patent: Aug. 24, 2004

(54) EFFICIENT DIRECT CURRENT COLLISION AND REACTION CELL

(76) Inventors: Ross C Willoughby, 655 William Pitt Way, Pittsburgh, PA (US) 15238; Edward W Sheehan, 655 William Pitt Way, Pittsburgh, PA (US) 15238

( * ) Notice: Subject to any disclaimer, the term of this patent is extended or adjusted under 35 U.S.C. 154(b) by 0 days.

(21) Appl. No.: 10/447,645

(22) Filed: May 29, 2003

Related U.S. Application Data

(60) Provisional application No. 60/384,436, filed on May 30, 2002.

(51) Int. Cl.[7] .................................... B01D 59/44

(52) U.S. Cl. .................... 250/281; 250/287; 250/282; 250/288; 250/298

(58) Field of Search ............................ 250/281, 287, 250/282, 288

(56) References Cited

U.S. PATENT DOCUMENTS

| | | | |
|---|---|---|---|
| 4,121,099 | A | 10/1978 | French et al. |
| 4,144,451 | A | 3/1979 | Kambara |
| 4,209,696 | A | 6/1980 | Fite |
| 4,234,791 | A | 11/1980 | Enke et al. |
| 4,736,101 | A | 4/1988 | Syka et al. |
| 5,202,563 | A | 4/1993 | Cotter et al. |
| 5,420,425 | A | 5/1995 | Bier et al. |
| 5,854,485 | A | 12/1998 | Bergmann |
| 6,534,764 | B1 | 3/2003 | Verentchikov et al. |

OTHER PUBLICATIONS

US 5,572,002, 11/1996, Schwartz et al. (withdrawn)

JE Hoffman, E., Tandem Mass Spectrometry: A Primer, J. Mass Spectrum, 31, pp. 129–137, 1996.

Yost, R.A., Fetterolf, D.D., "Tandem Mass Spectrometry (MS/MS) Instrumentation," Mass Spectrum Rev. 2, p 1–45, 1983.

*Primary Examiner*—John P. Lee
*Assistant Examiner*—Zia R. Hashmi

(57) ABSTRACT

An improved collison or reaction cell for collecting and focusing gas-phase ions in a mixture from an ion source or a mass analyzer into a gas-filled collision cell, inducing fragmentation or reaction of the ions by interaction with neutral or ionic gas-phase species, passing the resultant ionic products into another mass analyzer, determining the mass spectrum of the collision fragment ions to confirm the identity of the components in a mixture. The collision cell simultaneously provides collision gas confinements, precursor and product ion confinement, variability of collision energy, and variability of the DC drift field in the collision cell. Embodiments of this invention are methods and devices for improving the information content of chemical ionic species when coupled in tandem with mass analyzers.

18 Claims, 7 Drawing Sheets

EFFICIENT DIRECT CURRENT COLLISION AND REACTION CELL

CROSS-REFERENCE TO RELATED APPLICATION

This application claims the benefit of Provisional Patent Application Ser. Nr. 60/384,436, filed May 30, 2002.

GOVERNMENT SUPPORT

The invention described herein was made with United States Government support under Grant Number:. 1 R43 RR143396-1 from the Department of Health and Human Services. The U.S. Government may have certain fights to this invention.

BACKGROUND

1. Field of Invention

This invention relates to the field of analytical mass spectrometry. Specifically it introduces a new apparatus and methods for the identification and quantification of target compounds in a mixture by means of accepting an ion beam composed of either a single mass or ion clusters from an ion source, and further analyzing the ion beam by a controlled collision in a collision cell operated with direct current (DC) potentials, followed by mass analysis of the resulting fragments or de-clustered ions. More specially, the invention relates to the method of utilizing the collision cell to fragment ions at either high or low collision energy. Furthermore, the invention relates to methods of ionizing neutral fragments inside the collision cell and; also reacting ionic components within the collision cell with externally introduced counter ions or electrons—then analyzing these newly formed ionic species.

2. Description of Prior Art

Collisional induced dissociation (CID) is employed in tandem mass spectrometry is elucidate structural information of gas-phase ions derived from the ionization of organic and inorganic ions. The use of mass spectrometry to select gas-phase ions (precursor ions) for CID and analysis of the resulting fragments (product ions), has been extensively described in various reviews (Hoffmann, E., “Tandem mass spectrometry: A Primer,” J. Mass Spectrom. 31, pages 129–137,1996; Busch, K. L., Glish, G. L., McLuckey, S. A., “Mass Spectrometry/Mass Spectrometry: Techniques and Applications of Tandem Mass Spectrometry,” VCH Publishers: New York (1988), Yost, R. A., Fetterolf, D. D., Tandem mass spectrometry (MS/MS) instrumentation,” Mass Spectrom. Rev. 2, pages 1–45, 1983).

The oldest mass spectrometric configuration for tandem mass spectrometry is the combination of magnetic mass (B) and an electrostatic energy (E) sectors. The energy sector produces an ion kinetic energy separation providing information on metastable or CID ions. If a ‘field-free’ area is interposed between sectors, high energy ions are injected into this ‘field-free’ collision area undergoing collisions with the background gases (such as, helium or argon). Due to the low gas pressure ($10^{-3}$ torr), and the high forward velocity of the ion, there are very few collisions with the background gas. A collision, if it occurs, primarily involves a transfer of energy to the electrons of the molecule—resulting in odd-electron product ions. Because there are few collisions, the MS/MS spectrum typically shows a prominent precursor ion and low ion abundance of product ions.

If sectors are configured with a quadrupole collision cell and a quadrupole mass analyzer, both high and low energy collisions are possible (such as EBqQ). For low energy collisions, precursor ions are first selected with magnetic and electrostatic sectors, decelerated, then injected into high pressure quadrupole collision cell where they undergo multiple collisions with the background gas, and then mass analyzed with the second quadrupole. This Leads to product ion mass spectra that are similar to product ion spectra as observed in triple quadrupole MS/MS instruments (see below).

Other configurations utilizing sector analyzers have been configured and commercialized. In one alternative a time-of-flight mass analyzer (TOF) is placed in tandem with the sector analyzers and a surface induced collision (SID) cell, with the TOF mass analyzer performing high-resolution mass analysis of the product ions resulting from high energy collisions from SID.

The use of 3-dimensional ion traps (3-D IT) for MSIMS analysis using low-energy collisions is typified by Syka et al. (U.S. Pat. No. 4,736,101), Bier et al (U.S. Pat. No. 5,420,425), and Scwartz et al (U.S. Pat. No. 5,572,002). MS/MS analysis with the use of the 3-D IT uses at least two distinct mass analysis steps. First, a desired m/z is isolated in the trap by ejecting undesired ions during an ion accumulation step. This is performed using one of several techniques, such as applying a DC potential to the ring electrode, applying selective RF (waveforms), or scanning the RF so the undesirable ions are pass through the trap and are not accumulated. After the undesired ions are ejected from the trap, fragments or product ions can be formed when the ions that have remained in the trap are excited by applying a RF potential causing the ions to resonate (referred to as resonance excitation) and experience multiple collisions (low-energy) with the background gas, usually helium, inside the ion trap. The RF voltage (and possibly DC) is then readjusted to contain these lower mass fragments. The second MS step is then performed by ejecting the fragment ions by using a mass selective instability scan, such as, manipulation of the radio frequency amplitude, RF frequency, supplemental AC field amplitude, supplemental AC field frequency, or a combination thereof to eject ions out of the trap and collection and detection by a electron multiplier—thus performing two mass spectrometry steps with one device (MS/MS in time). Additional steps of accumulation, ejection, and fragmentation can be performed leading to $MS/MS^n$ (MS/MS to the nth degree, n=1, 2, 3, . . . ).

Other configurations utilizing 3-D IT assemblies as MSIMS analyzers have been configured and commercialized. In one alternative a time-of-flight mass analyzer is placed in tandem with a 3-D IT, with the TOF mass analyzer performing high-resolution mass analysis of the product ions. In others, a 3-D IT or a 2-D linear IT (q) replaces the third quadrupole in a triple quad system (see below), allowing further fragmentation of the product ions, leading to $MS/MS^n$ (see Bier et al., U.S. Pat. No. 5,420,425 for a 2-D linear IT). Recently a 2-D linear IT has been combined with a fourier transform mass spectrometer (Qq-FTMS), resulting in high-resolution mass analysis of the product ions similar to 3-D IT-TOF and the Q-TOF (see below).

Enke et al (U.S. Pat. No. 4,234,791) have described a quadrupole mass spectrometer system-three quadrupoles in tandem, typically referred to as a triple quad (QqQ). The first quadrupole is operated in a mode where both RF and DC voltages are applied to the rods and a resolution is chosen (by choosing a ratio of RF/DC ratio) to select one ion mass (or mass range) from the first quadrupole and then introducing it into a second quadrupole. The second quadrupole is operated with no DC voltage and at elevated pressures (millitorr range) relative to the first and third quadrupole, and only a relatively small RF voltage (usually ⅓–½ of the Rf of the first quadrupole) is applied to the rods. In this mode, the second quadrupole acts as a 'high pass mass filter'—rejecting the passage of all masses below a certain mass (commonly referred to as low mass cutoff) and passing all masses above this mass. Fragments, or product ions, can then be formed by passing (or injecting) the precursor ions from the first quadrupole into the second quadrupole at elevated pressures and colliding these ions with a neutral gas, such as argon, nitrogen, or just air in combination with a voltage difference (commonly referred to as in-lab collision energy, typically 10–100 ev) between the lens before the entrance to the first quadrupole and second quadrupole. The fragments in the second quadrupole are then passed to the third quadrupole.

The third quadrupole, operated in a similar manner to the first quadrupole, can pass one particular mass. This mode being commonly referred to SRM (selective reaction monitoring). Alternatively, the third quadrupole is scanned (varying the RF/DC ratio) and placing ions exiting the second quadrupole producing a mass spectrum of the collision fragment ions emerging from the second quadrupole. Other configurations utilizing quadrupole assemblies have been configured and commercialized. The third quadrupole has been replaced with a time-of-flight (TOF) mass analyzers, resulting in a Q-TOF instruments having the ability of producing high resolution mass spectra of product ion. Alternatively a 3-D IT or 2-D linear IT is used, resulting a Qq-IT or Qq-Linear IT instruments producing low resolution MS/MS$^n$ spectra.

Bergmann (U.S. No. Pat. 5,854,485), Cotter et al (U.S. Pat. No. 5,202,563), and Verentchikov et al. (U.S. Pat. No. 6,534,734) have described a time-of-flight (TOF) mass analyzers configured in tandem (TOF-TOF). Typically ions are injected into the first TOF, as they exit the first TOF precursor ions of a prescribed flight time are allowed to pass into a collision cell at low gas pressures (~$10^{-3}$ torr) all other ions, shorter and longer flight times, are deflected and not allowed to enter the collision cell. In the collision cell, the precursor ions undergo a small number of collisions resulting in high energy fragments. Any remaining precursor ions and product ions are then pulsed into the second TOF mass analyzer—resulting in high resolution mass spectra of product ions.

A commonly used alternative method of fragmenting molecules for mass spectrometry is referred to as "in-beam" fragmentation. This approach incorporates a high electric field in the free jet expansion into the sub-torr region of interfaces from atmospheric pressure ion sources. Usually this is the second stage of pumping in multistage interfaces. Early implementations of this approach are described by Fite (U.S. Pat. No. 4,209,696), French et al. (U.S. Pat. No. 4,121,099), and Kambara (U.S. Pat. No. 4,144,451).

SUMMARY

In accordance with the present invention a higher pressure collision cell comprises both low-field and a high-field electrostatic regions, provided by direct current (DC) electrostatic potentials; the cell is pressurized with a inert or reactive gas to facilitate efficient collisional damping and collection of gas-phase ions.

Objectives and Advantages

The objective of the present invention is to increase the collection and reaction efficiency of gas-phase ions undergoing collisions or reactions with neutral background gases, reagent gases, or electrons; several objects and advantages of the present invention are:

(a) To provide a more versatile collision cell that can be operated both at relatively high [above 1 keV] or low [below 100 ev] collision energies.

(b) To provide a more highly pressurized collision cell (1–100 Torr) compared to conventional collision cells. The advantage of higher pressure allows more efficient and higher compression focusing of precursor and product ions compared to lower pressure cells where inertial components of motion make efficient focusing problematic.

(c) To provide a collision cell where the mean free path and electric field can be adjusted to yield a controlled precursor ion dissociation process by either single or multiple collisions.

(d) To provide collision cell where improved optics compression allows the use of smaller, lower conductance apertures compared to conventional optics.

(e) To provide a collision cell where the degree or extent of fragmentation can be controlled by means of adjusting the gas pressure, gas composition, electrostatic potentials, or a combination.

(f) To provide a collision cell where scattering losses are minimized compared to conventional lower pressure cells.

(g) To provide a collision cell where neutral fragmentation products can be re-ionized be a suitable chemical ionization reagent ion to provide capability of mass analyzing neutral fragment products.

(h) To provide a collision cell where multiply charged incident ions can efficiently capture electrons in order to undergo electron capture dissociation, with said dissociation products being efficiently collected, focused, and transmitted to a downstream mass analyzer.

Further objects and advantages are to provide a collision cell to use the collision cell to precisely control and determined the collision energy; and which can be used to introduce externally generated gas-phase ions into the collision cell to ionize gas-phase neutral components or neutral fragments (by means of chemical ionization), or react electrons with ionic components in the collision cell (as described in McLafferty, F. W., Horn, D. M. Breuker, K., Ying, G., Lewis, M. A., Cerda, B., Zubarev, R. A., Carpenter, B. K., "Electron capture dissociation of gaseous multiply charged ions by fourier-transfrom ion cyclotron resonance," J. Am. Soc. Mass Spectom. 12, pages 245–249, 2001). Still further objects and advantages will become apparent from a consideration of the ensuing descriptions and drawings.

| REFERENCE NUMBER IN DRAWINGS | |
|---|---|
| 10 | Funnel Region Can |
| 20 | Entrance Aperture |
| 22 | Entrance Focusing Lens |
| 24 | Entrance Focusing Aperture |
| 30 | Exit Aperture |
| 40 | Entrance Wall |
| 50 | Exit Wall |
| 52 | Outer Perforated Cylinder Lens |
| 54 | Inner Perforated Cylinder Lens |
| 56 | Ion-Molecule Reaction Region |
| 58 | Reaction Product Ion Trajectories |
| 60 | Reagent Ion Source |
| 62 | Reagent Gas Source |
| 64 | Reagent Gas Inlet |
| 66 | Electron Source |
| 67 | Electron Source |
| 68 | Reagent Ion Trajectories |
| 70 | Intra-Cell Aperture Wall |
| 72 | Intra-Cell Aperture |
| 80 | Funnel Region |
| 82 | Collisional Dissociation Region |
| 83 | Electron Capture Region |
| 84 | Product Ion Trajectories |
| 85 | Precursor Ion Trajectories |
| 86 | Equipotential Lines |

-continued

| REFERENCE NUMBER IN DRAWINGS | |
|---|---|
| 88 | Neutral Fragment Motion |
| 90 | Deep-Well Region |
| 92 | Collision Gas Source |
| 94 | Collision Gas Inlet |
| 96 | Deep-Well Ring Insulator |
| 100 | Ion Source Region |
| 102 | Incident Ion Beam |
| 110 | Analysis and Detection Region |
| 111 | Deflector Entrance Lenses |
| 112 | Deflector Ring Electrode |
| 113 | Left Deflector Lenses |
| 114 | First Deflector End Cap |
| 115 | Right Deflector Lenses |
| 116 | Second Deflector End Cap |
| 120 | Pumping Region |
| 122 | Pump-out Gas Flow |
| 130 | Incident Ion Region |
| 140 | High-Vacuum Region |

DESCRIPTION—FIGS. 1A, 1B, AND 2—PREFERRED EMBODIMENT

[Direct Current (DC) Collision Cell with Front-end Collisionally Induced Dissociation (CID)]

Figure 1A:
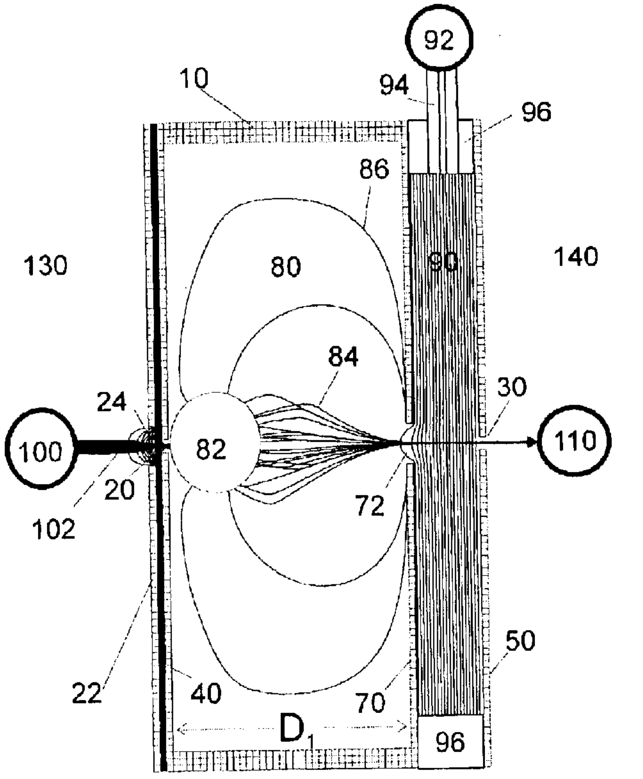
FIG. 1A is a cross-sectional illustration of a DC collision cell with front-end CID, showing the focusing of collision products in the funnel region and subsequent transmission through an exit aperture.
Figure 1B:
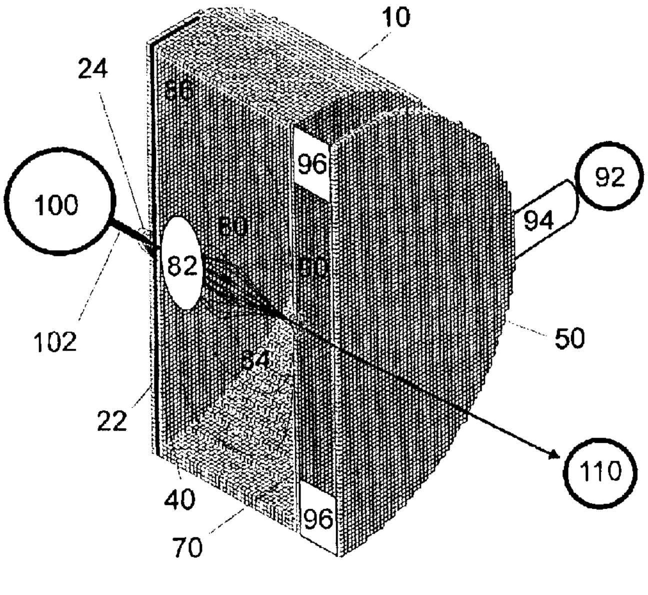
FIG. 1B is a 3-dimensional cutaway of the DC collision cell shown in FIG. 1A.

A preferred embodiment of the DC collision cell or just cell of the present invention is illustrated in FIGS. 1A and 1B with an incident ion beam 102 directed from an ion source region 100 through an entrance aperture 20 into a funnel-region 80 held at a pressure with a mean free path at least 10 times the distance $D_1$ from an entrance wall 40 to an intra-cell aperture wall 70. In this embodiment incident ions are introduced at sufficiently high kinetic energy that their collisions with collision or target gas, neutral gas molecules, such as, nitrogen, argon, hydrogen, ammonia, or methane supplied from a collision gas source 92 through a gas inlet 94; in a collisional dissociation region 82 near the entrance aperture 20 will cause the incident ions to collisionally dissociate into fragment ions and/or neutral dissociation products. The incident ion energy can be controlled remotely by biasing the electric potential of the entrance wall 40 relative to the source of ions (ion source region 100) or locally by adjusting the electric potential applied to an entrance focusing lens 22, with an entrance focusing aperture 24 coaxial with the entrance aperture 20.

Once formed the motion of the fragment ions are thermalized due to multiple collisions in the relatively high-pressured cell compared to the lower pressures in the incident ion 102 and high-vacuum regions 130, 140, respectively; and the motion of the ions is primarily determined by acceleration in the local electric field. The fragments ions and residual incident ions are focused (as illustrated by ion trajectories 84) down the funnel-shaped field (as illustrated by the shape of equipotential lines 86) through the an intra-cell aperture 72 and into a deep-well region 90 of the cell. The ions are focused at an exit aperture 30 residing in an exit wall 50. Ions are then transferred to an analysis and detection region 110, which resides in the high-vacuum region 140, where they are further focused, analyzed, and detected by convention means such as radio frequency (rf) ion guides, dc optics, mass analyzers, electron multipliers, etc.

Figure 2:
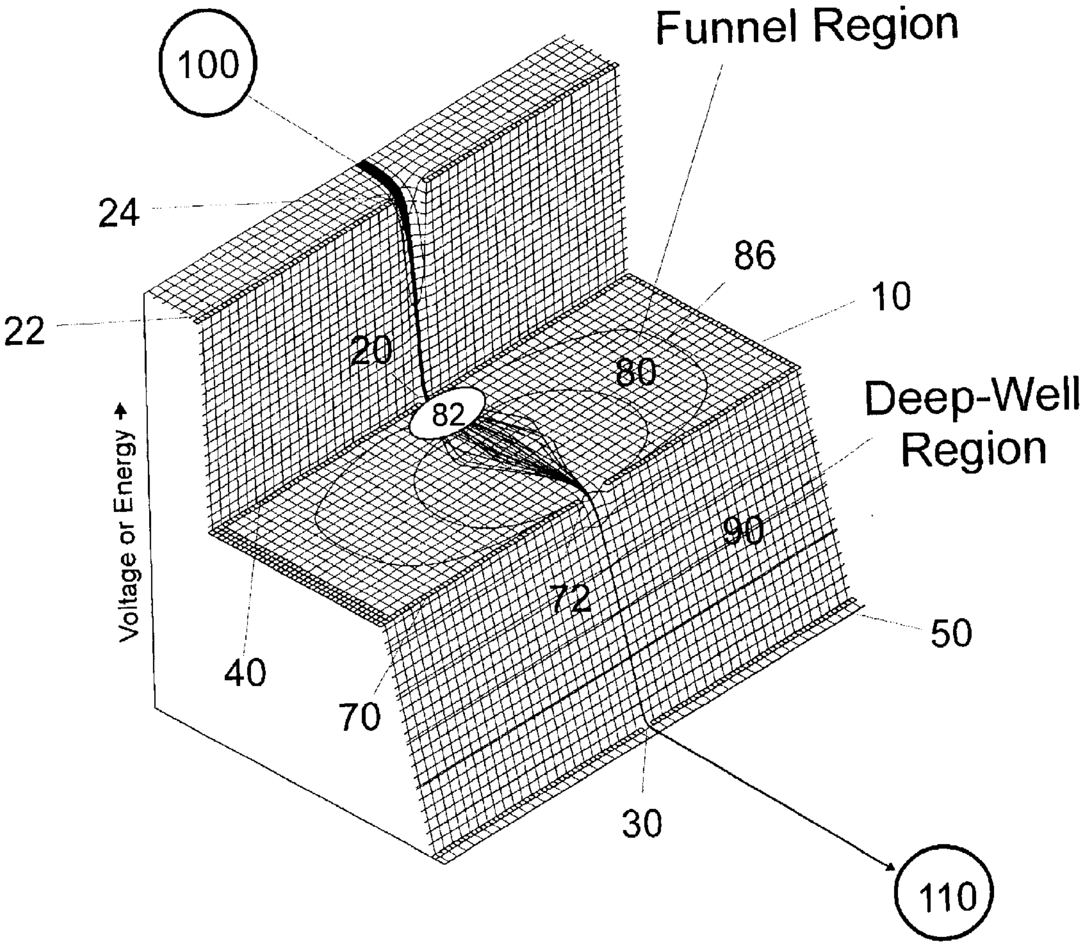
FIG. 2 is a potential energy surface of the device in FIG. 1 showing the region of high field where front-end CID occurs. Also show is the focusing of ions in a funnel and deep well regions of the cell, where a high percentage of the fragment ions are focused through a relatively small exit aperture for subsequent analysis.

FIG. 2 is a potential energy surface plot of the cell illustrated in FIGS. 1A and 1B showing the relative potentials applied to the walls and lens of the cell, and the shape of the electrical field that is directing the motion of the ions. The device in FIGS. 1A and 1B utilizes Front-End CID where there is a high electrical potential difference between the entrance wall 40 and the entrance focusing lens 22. The high electric field generated between these elements both focuses and accelerates ions from the ion source region 100 through the entrance focusing aperture 24 and into the collisional dissociation region 82. The entrance wall 40, a funnel region can 10, and the intra-cell aperture wall 70 are held at or near the same potential. The exit wall 50 is held at a large potential difference relative to the intra-cell aperture wall 70, thus creating a deep potential well. The intra-cell aperture wall 70 is electrically isolated from exit wall by a deep-well ring insulator 96.

The incident ion region 130 is held at a lower pressure than the cell for Front-End CID to occur. The pressure of the ion source region 100 can be any of a wide variety of pressures from atmospheric (760 torr) to low pressure (such as, $10^{-8}$ to $10^{-3}$ torr) and any number of stages of mass analysis, pressure reduction, and/or focusing may occur between the ion source region 100 and the cell.

Figure 3A:
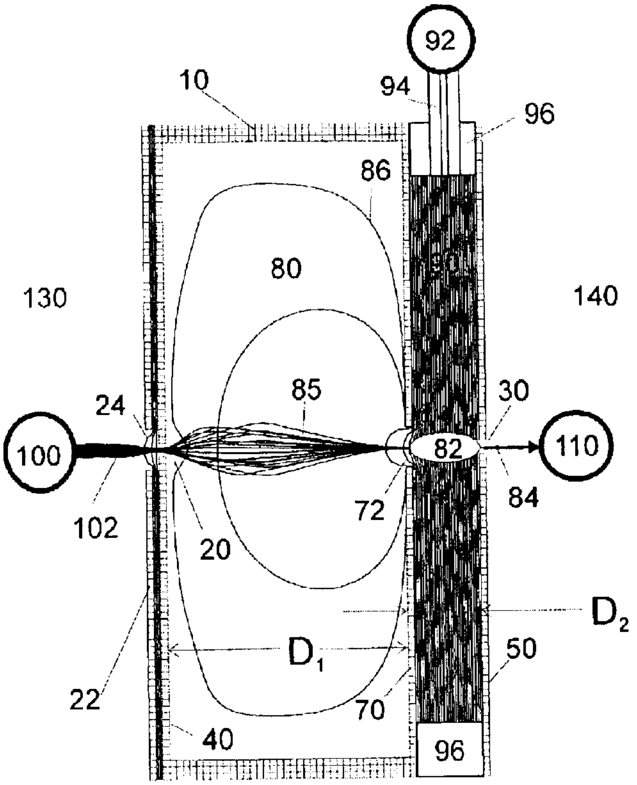
FIG. 3A is a cross-sectional illustration of a DC collision cell with deep-well CID, showing the focusing of collision products in a funnel region and subsequent transmission through an exit aperture.
Figure 3B:
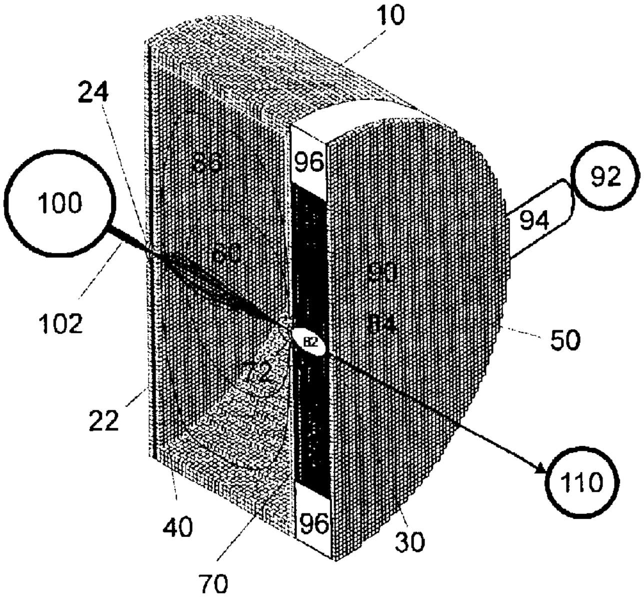
FIG. 3B is a 3dimensional cutaway of the DC collision cell shown in FIG. 3A.
Figure 4:
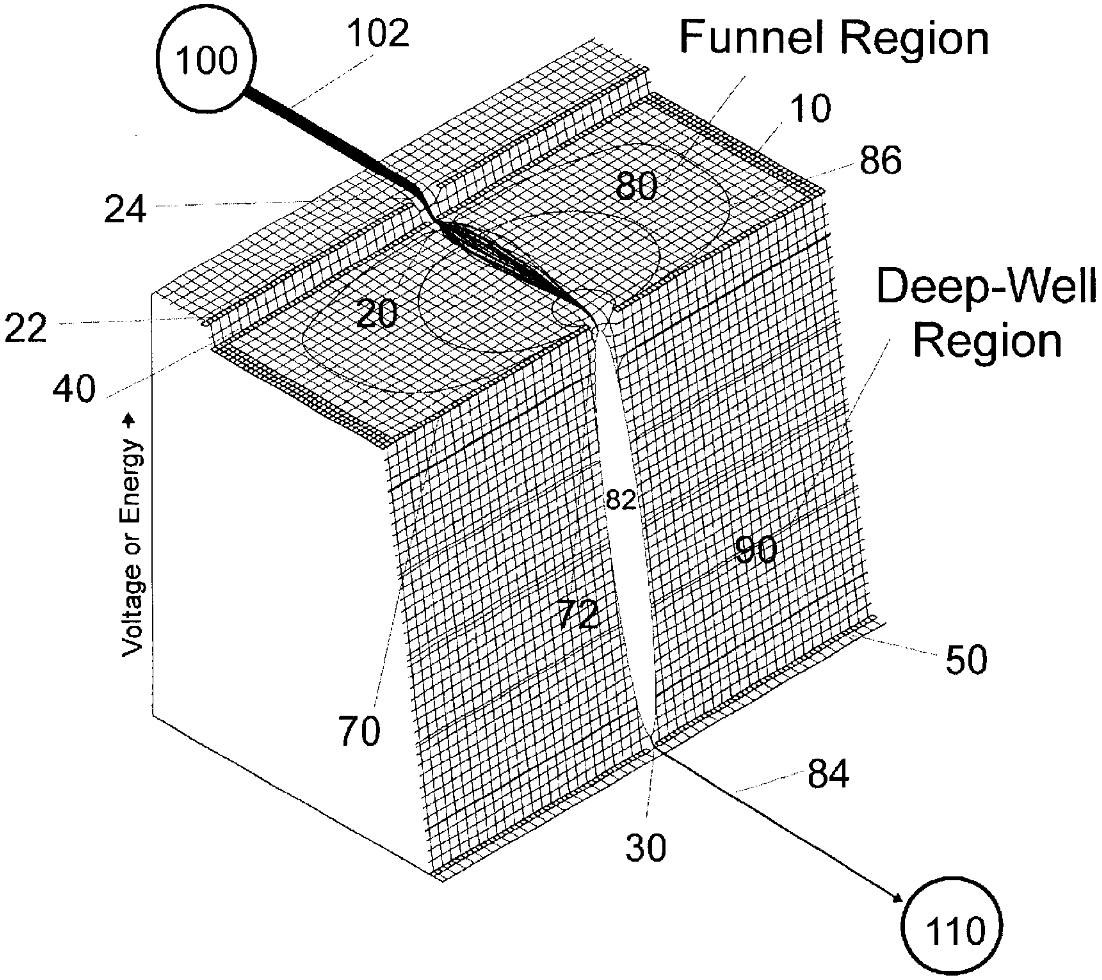
FIG. 4 is a potential energy surface of the collision cell in FIG. 3A showing a region of high-field strength where deep-well CID occurs. Also show is the focusing of parent ions in the funnel region and subsequent CID in the deep-well region of the cell.

FIGS. 3 and 4—Additional Embodiment [DC Collision Cell with Deep-well Collisionally Induced Dissociation (CID)]

An additional embodiment is shown in FIGS. 3 and 4, a Deep-Well CID, of the cell with the incident ion beam 102 directed from the ion source region 100 through the entrance aperture 20 into a funnel region 80 held at a pressure with a mean free path at least 10 times the distance $D_1$ from the entrance wall 40 to the intra-cell aperture wall 70. In this embodiment, the ions are introduced at relatively low kinetic energy so that their collisions with a neutral collision gas in the region near the entrance aperture 20 are relatively elastic and motion is damped. The incident ion energy can be experimentally controlled remotely by biasing the electrical potential of the cell relative to the source of ions (ion source region 100) or locally by adjusting the potential applied to the entrance focusing lens 22, with the entrance focusing aperture 24 coaxial with the entrance aperture 20.

It is the intent of this embodiment of the invention to have good transmission of incident ions into the cell, while keeping dissociation from the collisions in the funnel-region 80 to a minimum. It should be noted that this embodiment is more suited for low energy sources of ions (ion source region 100) such as those emanating from quadrupole mass filters, from the first stage of a multi-stage interface between atmospheric sources of ions and low-pressure analyzers, etc. The incident ion motion is thermalized due to collisions in the relatively high-pressures in region 80 compared to lower pressures in region 130. The motion of the ions is primarily determined by acceleration in the local electric field. The incident ions are focused (as illustrated by the precursor ion trajectories 84) down the funnel-shaped field (as illustrated by the shape of the equipotential lines 86) through the intra-cell aperture 72 and into the deep-well region 90 of the collision cell. The distance between the intra-aperture wall 70 and the exit wall 50 is designated $D_2$. The high field of the deep-well region 90 coupled with the appropriate pressure will result in sufficiently energetic collisions between the ions in the incident ion beam 102 and the collision gas supplied from the collision gas source 92 via the collision gas inlet 94. Dissociation in the collisional dissociation region 82 will result from one or more collisions that occur in this relatively uniform field. The field strength and consequently the collision energy can be adjusted by changing the potential difference between the inter-cell aperture wall 70 and the exit wall 50. The fragment ions from dissociation are focused at the exit aperture 30 residing in the exit wall 50 and transferred into region 110.

FIG. 3B illustrates a 3-dimensional cutaway of the cell showing assembly of this alternate preferred embodiment with the funnel region can 10, the entrance wall 40, the exit wall 50, and the deep-well ring insulator 96. The ion trajectories 84 are also included to illustrate the general direction of motion of the fragment ions. Collision region 82 is the approximate region where ions from the incident ion beam 102 collide with the collision gas in the deep-well region 90. Collisionally activated ions will then proceed to dissociate into products ions that will accelerate toward the exit aperture 30. Ions are then transferred to the analysis and detection region 110 by convention means such as radio frequency ion guides, mass analyzers, electron multipliers, etc.

FIG. 4 is a potential energy surface plot of the alternative preferred embodiment illustrated in FIG. 3 showing the relative potentials applied to the walls and lens of the cell, and the shape of the field that is directing the motion of the ions. Note the relatively low potential difference between the entrance wall 40 and the entrance focusing lens 22. The low field generated between these elements both focuses and gently accelerates ions from the ion source region 100 into the funnel region 80 but does not result in dissociation of incident ions. Also note the relatively high field in the deep-well region 90 that does contribute to the collisional dissociation occurring in collisional dissociation region 82.

Figure 5A:
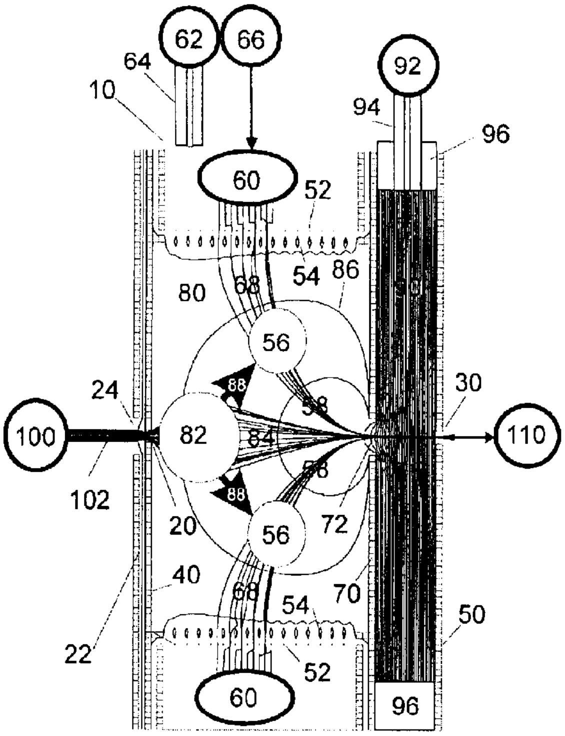
FIG. 5A is a cross-sectional illustration of a DC collision cell that incorporates the production of chemical ionization reagent ions (of the same polarity as parent) and subsequent introduction of these reagent ions into a funnel region in order to re-ionize neutral fragments created from the initial collisional dissociation reaction by chemical ionization.
Figure 5B:
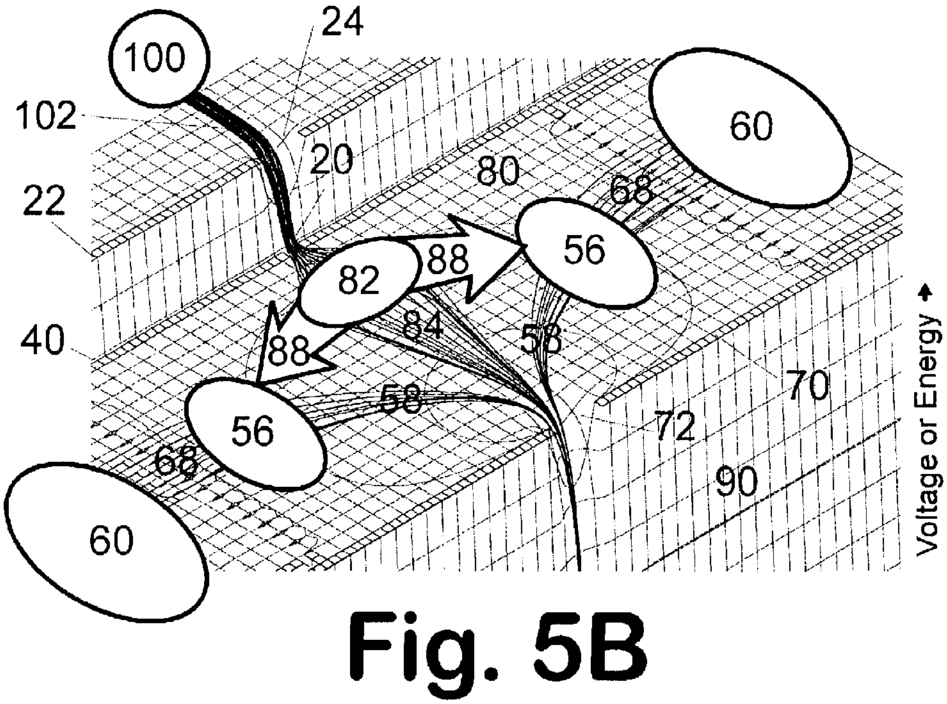
FIG. 5B shows a potential energy surface for the funnel region of the collision cell in FIG. 5A, showing the general motion of incident ions, collisionally fragmented ions, neutral fragments, reagent ions, and finally re-ionized neutral fragments.
Figure 6:
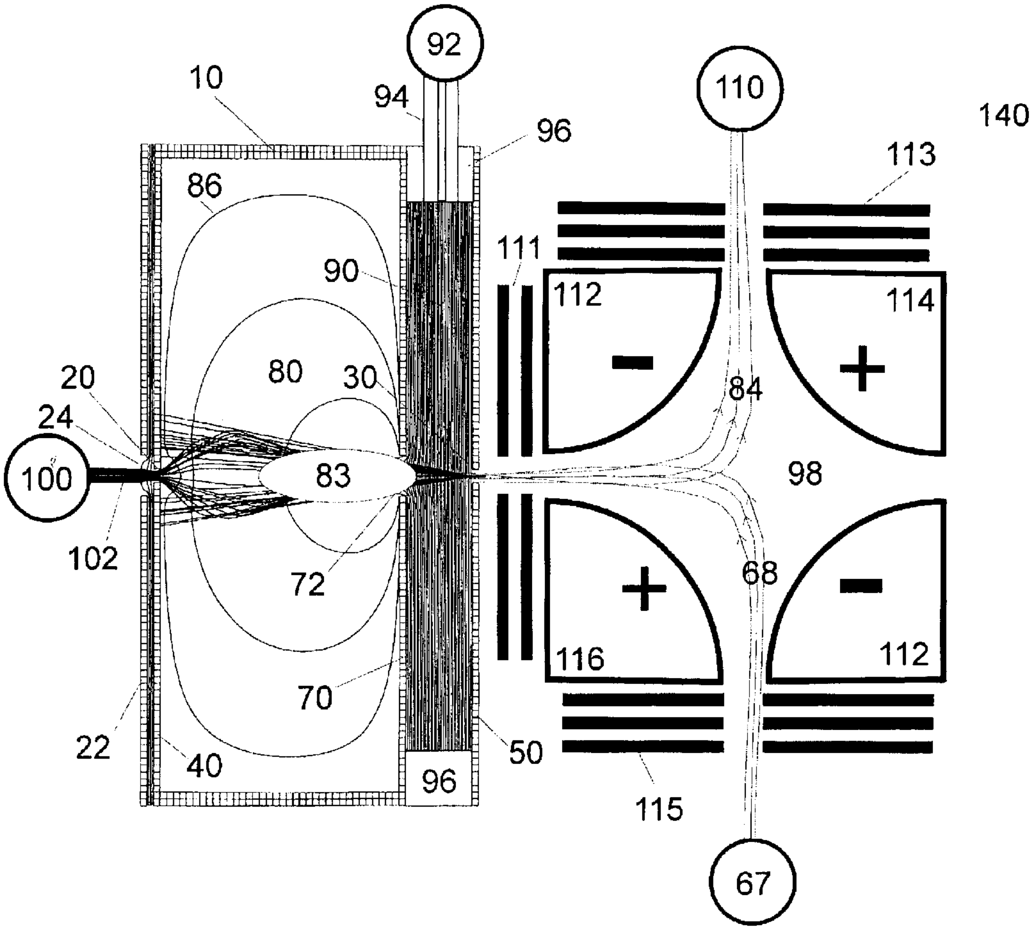
FIG. 6 is a cross-sectional illustration of a DC collision cell that incorporates the introduction of electrons or negative ions downstream from the cell and subsequent introduction into the collision cell using a DC quadrupolar deflection lens. The DC quadrupolar deflection lens serves to both deflect positive ions exiting out of the cell for mass analysis and to focus electrons or negative ions into the collision cell, the negatively charged species flow counter to the flow of the positive ions. This cofiguration is intended to facilitate the capture of electrons by multiply positively charged species being focused inside the cell resulting in excess energy and subsequent dissociation or fragmentation (Electron Capture Dissociation—ECD) by the capturing species. The ECD reactions are in many cases uniquely different from the CID reactions. This device can also be used to react multiply charged species with a negative ion component thereby tagging the multiply charge species.

FIGS. 5–6—Alternative Embodiments [Remote Chemical Ionization (Cl), Electron Capture Dissociation (ECD), and External Pumping]

Figure 7A:
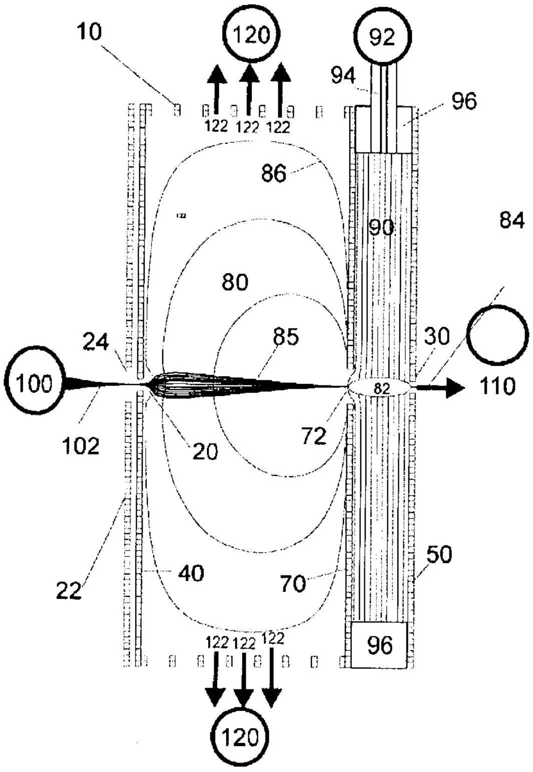
FIG. 7A is a cross-sectional illustration of a DC collision cell with the added capability of evacuation of the cell by vacuum pumps.
Figure 7B:
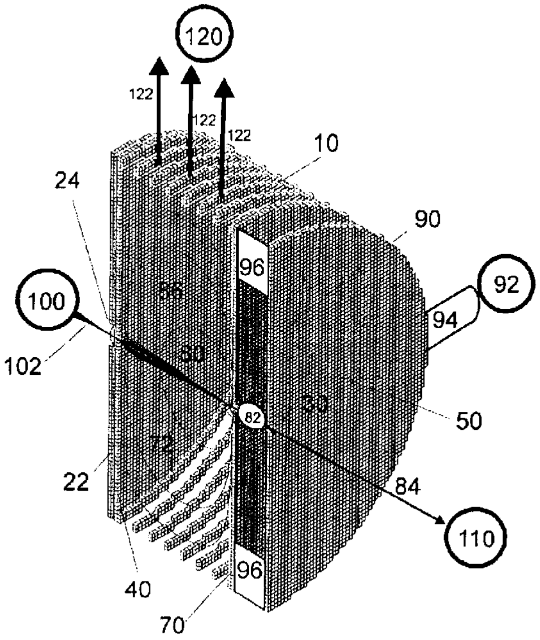
FIG. 7B is a 3-dimentional cutaway of the collision cell shown in FIG. 7A.

There are other possibilities with regard to alternative means of obtaining more complete information about the dissociated products, an alternative means of inducing dissociation, and dealing with possible larger gas loads from the source of ions as shown in FIGS. 5, 6, and 7, respectively. FIGS. 5A and 5B shows a cell that performs in much the same manner as the cell in FIGS. 1 through 4 with the noted exception that a source of reagent ions (reagent ion source 60 ) resulting from chemical ionization is added to the funnel region 80 of the cell in order to re-ionize the neutral fragmentation products of the collisional dissociation reaction. One distinct problem with collisionally induced dissociation (CID) is the loss of structural information with neutral fragments (which cannot directly be analyzed by mass spectrometry). With this device we are adding the ability to ionize the neutral fragments by ion-molecule reaction with an appropriate reagent ion, then further analyzing the re-ionized neutral fragment ions by mass analysis.

Reagent gas in introduced into a reagent ion source 60 from a reagent gas source 62 through a reagent gas inlet 64. The reagent gas source 62 is a metered and preferably regulated supply of gas of sufficient composition and purity to affect the production of appropriate reagent ions. Electrons from an electron source 66 are introduce into the reagent ion source 60 directly through discharge or indirectly through a regulated filament supply or other means of producing electrons of sufficient energy and current. The electrons undergo appropriate ion-molecule reactions with the gas from the gas source 62 in order to produce suitable reagent ions in the reagent ion source 60. The reagent ions generated in source 60 are accelerated through an outer perforated cylinder lens 52 and an inner perforated cylinder lens 54 into the funnel region 80. Reagent ion trajectories 68 indicate the motion of reagent ions in the electric field. Neutral fragment ions formed by collisional dissociation in collisional dissociation region 82 diffuse away from the region 82 toward an ion-molecule reaction region 56 on neutral fragment trajectories 88. The neutral fragment molecules react with the reagent ions in the ion-molecule reaction region 56. Charged reaction products from this reaction along with product and any residue incident ions from region 82 follow reaction product ion trajectories 58 and are focused and transported out of the funnel region 80 into the deep-well region 90, through the intra-cell and exit apertures 72, 30 and into the analysis and detection region 110.

FIG. 5B shows a potential energy surface showing the movement of incident ions, reagent ions, and neutral dissociation fragments into and through the funnel region 80. All ions of the appropriate ion polarity end up flowing into the deep-well region 90.

FIG. 6 shows a cell not utilized as a collisional dissociation cell; but rather as electron capture dissociation (ECD) cell. A DC quadrupole deflector positioned downstream of the cell in the high-vacuum region 140 is utilized to facilitate the interception of positive ions with electrons from a remote electron source 67. The deflector in this device is a 3 -dimensional quadrupole ion trap with hyperbolic surfaces with a deflector ring electrode 112 held at a negative potential equal and opposite to a first deflector end cap 114 and a second deflector end cap 116. Deflector entrance 111, a right deflector 113, and a left deflector lens 115 serve to control the position and energy of ions entering and leaving the deflector. The electron source in this case can be any type, such as but not limited to a regulated filament source, to supply electrons of appropriate current and energy.

Positively charged incident ions moving downstream react with the reagent ions, electrons, flowing upstream from the remote electron source 67 into the cell through the exit aperture 30. The reagent ion trajectories 68 represent the motion of electrons moving upstream from the source 67 and through (in this case) the cell. The excess energy of imparted on the ions in the incident ion beam 102 by electron-capture results in dissociation pathways that may be somewhat different than observed with CID and may facilitate elucidation of chemical species, such as multiply positively charged peptides or proteins, etc.

The DC deflector functionally serves as an energy analyzer, but also has the added benefit of accepting positive ions from the cell while simultaneously accepting electrons from a remote source. It should also be stated that negative ions other than electrons might also be formed externally in region 67 and introduced in the DC deflector and subsequently introduced into the cell. In this situation an ion-ion reaction would occur in the cell in region 83 between positively charged analytes and negatively charged reagent ions instead of electron capture.

FIGS. 7A and 7 B shows a cell where funnel can 10 is perforated in order to conduct gas from the cell to an external pumping means in a pumping region 120 in the direction of a pump-out gas flow 122. This additional pumping is for application where the incident ion beam 102 has a large gas load associated with it thereby maintaining the cell at pressure-electrical field requirements for CID or other reaction processes. This specific embodiment would be associated with the cell being placed in the second stage of pumping for a two-stage pressure reduction that is commonly be associated with atmospheric pressure ionization inlets. Alternatively, the cell would be placed downstream of a radio frequency (RF) ion guide utilized with in other types of atmospheric pressure ionization inlets. One important operational detail is that more appropriate collision gases from the gas source 92 could be added to the collisional dissociation region 82 compared to the gases that were flowing in through the entrance focusing aperture 24 with the incident ion beam 102.

Advantages

From the description above, a number of advantages of our higher-pressure DC collision cell become evident:

(a) By incorporating the high-field electrostatic region [deep-well region] downstream to the low-field electrostatic region, efficient fragmentation and focusing may be accomplished in the same collision cell.

(b) Sandwiching the collision cell between of an atmospheric inlet to a mass analyzer will permit the efficient fragmentation and transmission of the gas-phase ions from the atmospheric pressure ionization source before mass analysis.

(c) Although the components of the collision cell may be made of metal tubes, plates, or lens; the components of the cell may be made of laminated materials composed of an insulating base with thin metal layers laminated on each side of the base.

(d) By incorporating gas exhaust and gas inlets the composition of the gas in the collision cell may be composed of a gas different from the gas introduced with the precursor ions.

(e) The presence of an inlet for reactive gases will permit the collision cell to be used as a "reaction vessel" to perform gas-phase ion chemistry.

(f) Counter ions and electrons may be injected at the exit of the collision cell traveling upstream of [counter to] the flow of the precursor and fragment ions traveling through the high-field electrostatic field region into the low-field electrostatic field region.

(g) Neutral fragments resulting from the fragmentation of the precursor ions can be ionized by injecting externally generated gas-phase reagent ions or electrons into the low-field electrostatic field region of the collision cells.

Operation—FIGS. 1 thru 7

The current device is intended to provide an efficient collision and reaction cell for use with mass spectrometers. This cell is intended to operate between two mass analyzers as would be typical for the collision cell in mass spectrometry/mass spectrometry (MS/MS) or commonly referred to as tandem mass spectrometry. The general operation being that an incident ion is selected with one stage of mass separation and the ionic products or fragments of collisional dissociation or reactions in the cell are separated and detected with a second stage of mass analysis. We envision that this cell will have operational application with many combinations of mass analyzer; such as Q-cell-Q, TOF-cell-TOF, Q-cell-TOF, Q-cell-Sector, Sector-cell-Sector, Ion-Trap-cell-TOF, etc.

We also envision that this cell is capable of accepting and transmitting ions from various high and low pressure sources, such as electrospray, APCI, MALDI, AP-MALDI, Cl, APPI, etc. This implementation would operate as a collision/reaction cell for generation of various reaction products; but would lack the obvious selectivity on the incident ions by mass spectrometry that MS/MS possesses. In this case, the cell can still be used for structural elucidation or identification of analytes such as those separated and delivered by a chromatographic system, such as liquid or gas chromatograph, ion mobility spectrometry, etc.

It is also important to state that we envision that this device may be coupled with a wide variety ion optics and transmission devices, such as RF ion guides operated at various pressures, einsel lens stacks, magnetic focusing devices, etc. Suffice it to say that many modes of conventional focusing of the incident beam of ions 102 or the exiting beam of ions 84 may be employed. We envision that the exiting beam of ions 84 be of acceptable spatial and energy distribution to be transmitted by any on-axis, deflection, or orthogonal analyzing device.

The first mode of operation (FIGS. 1 and 2) of the present device for CID reaction is referred to as Front-End CID because the reactions occur in the front portion of or entrance to the cell, where the incident ions contain adequate energy, as they are focused into the cell through the entrance aperture 20, that collisions with the target gas supplied from the source 92 in region 82 are sufficiently energetic and inelastic to enable the incident ions to dissociate or fragment. The energy of the incident ion beam 102 can be controlled by adjusting the voltage difference between the entrance wall 40 and the entrance-focusing lens 22. Product ions from the dissociation reaction are directed and focused downstream toward the exit aperture 30 in a DC field that is generated by the voltage difference between the funnel region can 10 and the voltage applied to the exit wall 50. The voltage between the funnel region can 10 and the exit wall 50 is held below the breakdown voltage of the collision gas contained in the cell at the pressure of operation.

A key component of the operation is that the pressure of the cell is held at pressures higher than conventional collision cells, typically 0.1 to 10 Torr. The practical operational regime is a compromise between pressure in the cell, gas loads from the ion source 100 and collision gas source 92, aperture sizes (exit 30 and entrance 20), and pumping capability. It should also be noted that the pressure in both the funnel region 80 and the deep-well regions 90 are essentially equal. The collision gas inlet 94 can be affixed to either region 80, 90 to provide target or collision gas flow. Collision gases are selected based on a wide variety of criterion including, mass, reactivity, and breakdown potential.

The second mode of operation (FIGS. 3 and 4) of the present device for CID reaction is referred to as Deep-Well CID because the reactions occur in the uniform field of the deep-well region 90. Ions in the incident ion beam 102 are introduced into the cell through the entrance aperture 20. The initial collisions of the ions with collision gases in the funnel region 80 are elastic and lack sufficient energy to enable the incident ions to dissociate. The incident ions are further focused and accelerated into the deep-well region 90. In this mode the high uniform field in the deep-well region 90 along with the pressure of the cell are adjusted to determine the collision energy, facilitating inelastic collisions of sufficient magnitude to increase the internal energy of the incident ions. It should be noted that multiple collisions may be required to "pump up" the internal energy of the ions in this region. The physical spacing $D_2$ between the intra-cell wall 70 and the exit wall 50 are selected to determine the number of collision in the well. Note the narrow spacing of equipotential lines 86 in FIGS. 3 and 4 in the deep-well region 90 designating a high electrical field in this region. The deep-well region 90 fields are generally at higher strength in the Deep-Well CID mode when compared to the Front-End CID mode.

The cell can be used as both a dissociation cell and a reaction cell. This has applications where chemical reagents, both neutral gases and ionic species, can be added to the cell to interact with ions from the ion source region, facilitating chemical reaction to facilitate dissociation. In this manner, charged products from this reaction can be transmitted through the cell, out the exit aperture 30 for subsequent analysis in region 110.

As shown in FIG. 5, when reagent ions from a chemical ionization source are introduced into the cell neutral products from the CID process can be ionized. Reagent ions formed in the reagent ion source 60 and are introduced into the funnel region 80 in order to ionize the resulting neutral products of the collisional dissociation reaction of ions in the Incident Ion Beam 102. A wide variety of conventional ionic reagents for chemical ionization can be generated in the periphery (reagent ion source 60), of the funnel region 80. This can be done with discharge or filament means for creating electrons, followed by creation of stable reagent ions, such as proton donors, $CH_5^+$ or $NH_4^+$, etc. Reagent ions from source 60 can be transmitted in excess into the funnel region 80 through apertures (not shown) or across perforated surfaces. Care must be taken to avoid significant field penetration from the reagent source 60 into the funnel region 80 in a manner that would diminish the collection efficiency in the funnel region 80. Neutral fragment trajectories 88 from the dissociation of the incident ions in collisional dissociation region 82 show movement radially away from the CID region 82. These neutral reaction products are brought in contact, in the ion-molecule reaction region 56, with the reagent ions introduced from the periphery of the funnel region 80. The resulting reaction product ions are focused toward and through the intra-cell aperture 72 along the reaction product ion Trajectories 58. The reaction product ions are transmitted out of the cell through exit aperture 30 for subsequent analysis and detection.

The cell can be used to react ions in the cell with electrons or other negative ions to induce fragmentation by means of electron capture dissociation (ECD) or tag the ions adding to the weight of the ions.

As shown in FIG. 6 when the cell is configured with an external electron source, positively multiply charge ions in the incident ion beam 102 are activated by the excess energy associated with electron capture, producing product ions. This special case of operation utilizes a beam of electrons that are introduced into the cell through exit aperture 30, as shown as electron trajectories 68. The charged species flow in opposite directions relative to each other, that is, the positive ions flow into the cell through the entrance aperture 20 and out through the exit aperture 30; while the electrons flow into the cell through the exit aperture 30. The electrons are thermalized in the higher-pressures of the cell and are captured by the positive multiply charge ions traversing the cell. Excess energy of the reaction goes into fragmentation. The positively charged fragmentation products are then transmitted and analyzed in the same manner as other collision or reaction products. This alternative has great utility for multiply charged ions such as those from electrospray that are not going to be neutralized by electron capture. Instead of electrons other negative ions can be introduced into the cell and react with the incident positive ions and instead of inducing fragmentation of the incident ions, they chemically react with the incident ions forming new ionic species.

The operation of this device requires that the electrons or negative ions be introduced on the same axis as the incident ions. This is accomplished using a DC ion trap quadrupole deflection device. Alternatively, electrons may be produced inside the cell and close to the axis of the trajectories of the incident beam.

FIG. 7 shows a cell evacuated by attaching an device such as a roughing or turbo-molecular pump to the cell. Under this embodiment, the cell would be capable of accommodating a much greater gas load from the collision gas source or inlets from atmospheric pressure ion sources.

Conclusion, Ramifications, and Scope

Although the description above contains many specifications, these should not be construed as limiting the scope of the invention but as merely providing illustration of some of the presently preferred embodiments of this invention. For example, the exit aperture and lens in the cell can have other orientations; such as the orifice and lens can be displaced off-axis from the entrance aperture; the cell may be manufactured by using the techniques of microelectronics fabrication, such as photolithography for creating patterns, etching for removing material, and deposition for coating the surfaces with specific materials; etc.

Thus the scope of the invention should be determined by appended claims and their legal equivalents, rather than by the examples given.

We claim:

1. An apparatus of mass spectrometry for the focusing and fragmenting gas-phase ions, said gas-phase ions are subjected to interactions with gas-phase species producing gas-phase neutral and charged or ionic products, and said ionic products are subjected to mass analysis, the apparatus comprising:

a. a source of said gas-phase ions, said ions are part of an incident beam of ions, said gas-phase ions of unknown sample molecules of widely varying molecular weights to produce molecular ions, fragment ions, cluster ions, or other ions derived from sample components;

b. a entrance means for receiving and directing said incident beam of ions at its inlet, which has the characteristics of electric fields produced by direct current;

c. a cell incorporating said entrance means for receiving and directing said gas-phase ions and funnel-well optics, with associated direct current power supply;

d. a collision region is said cell, wherein the collision of said gas-phase ions with gas-phase species is sufficient to fragment said gas-phase ions in said incident beam of ions into fragments ion and neutral fragment products;

e. an exit aperture through which substantially all said fragments ions are conducted to a lower pressure region, which has the characteristics of electric fields produced by direct current, said lower pressure region comprises apparatus for mass analysis.

2. An apparatus of mass spectrometry as claimed in claim 1, wherein said source of gas-phase ions is an atmospheric or near atmospheric pressure ionization source or a mass spectrometer, or a combination thereof.

3. An apparatus of mass spectrometry as claimed in claim 2, wherein said atmospheric or near atmospheric pressure ionization source is an atmospheric pressure chemical, discharge, or photo-ionization source; an electrospray source; or an inductively coupled plasma source.

4. An apparatus of mass spectrometry as claimed in claim 1, wherein said entrance means for receiving and directing said gas-phase ions is a laminated lens having a central opening through which substantially all said gas-phase ions from said ion source pass unobstructed into said cell, said laminated lens consisting of a insulating body of material, said insulating body having a topside and an underside, said insulating body has a set of metal laminates on said topside and said underside that are contiguous with said insulating body, said metal laminate on said topside of said insulating body is adjacent to said gas-phase ion source, said metal laminate on said underside of said insulating body is adjacent to said cell, said set of metal laminates being supplied with a first and second attracting electrostatic direct current potentials by connection to a voltage supply, and generating an electrostatic direct current field between said source of gas-phase ions and said set of metal laminates.

5. An apparatus of mass spectrometry as claimed in claim 1, wherein said funnel-well optics of said cell comprise a lens having a central opening through which substantially all said fragment ions and any residual gas-phase ions in said cell pass unobstructed into said region comprising said apparatus for mass analysis through said exit aperture, said exit aperture is incorporated in an exit lens, said lens is downstream of said entrance means and upstream of said exit lens, a second insulating body of material electrically isolates said lens and exit lens, said lens and exit lens being supplied with a third and fourth attracting electrostatic potentials by connection to a direct current voltage supply establishing electrostatic fields between said lens and exit lens, and between said entrance means and said lens.

6. An apparatus of mass spectrometry as claimed in claim 1, wherein said apparatus for mass analysis is a mass spectrometer, ion focusing devices, an ion mobility spectrometer, or a combination thereof.

7. An apparatus of mass spectrometry as claimed in claim 1, further including a gas-inlet wherein said gas-phase species are introduced into said cell and a gas-outlet to maintain pressure inside said cell at a pressure range of 1–100 torr, wherein said pressure in said cell is a higher pressure than pressure of said apparatus for mass analysis.

8. An apparatus of mass spectrometry as claimed in claim 1, wherein gas-phase species is a collision gas and can be comprised of neutral gas-phase molecules.

9. An apparatus of mass spectrometry as claimed in claim 8, wherein said neutral gas-phase molecules are comprised of helium, argon, nitrogen, air, or a combination thereof.

10. An apparatus of mass spectrometry as claimed in claim 1, further including a means of forming gas-phase reagent ions and a means of introducing said reagent ions into said cell, whereby said reagent ions can be comprised of molecular ions, fragment ions, cluster ions or combination thereof, said reagent ions interact with said neutral fragment products in said collision region, re-ionizing said neutral fragments forming a second set of fragment ions.

11. An apparatus of mass spectrometry as claimed in claim 1, wherein said gas-phase ions are positively charge ions or cluster ions, further including a means of forming electrons external to said cell and a means of introducing said electrons into said cell, whereby said electrons react with said positively charged ions in said collision region.

12. A method of focusing and fragmenting gas-phase ions in a collision region, said gas-phase ions from an ion source containing ions of interest for detection and analysis, said gas-phase ions of interest are molecular ions, fragment ions, cluster ions or a combination thereof, said method comprising:

a. providing electrostatic attraction to said gas-phase ions of interest from said ion source with electrostatic fields provided by an entrance lens, said entrance lens is a laminated lens comprised of an insulating base with metal laminates on the topside and underside of said base, having ion drawing direct current potentials, such that said electrostatic fields between said ion source and metal laminates are concentrated onto said metal laminate on topside of said insulating base of said laminated lens;

b. transmitting substantially all said gas-phase ions of interest from said ion source through said laminated lens allowing the unobstructed passage by providing a central opening in said laminated lens, said laminated lens having a low depth aspect ratio, a high openness aspect ratio, and a high electrostatic potential ratio between said metal laminates on the topside and underside of said laminated lens;

c. pressurizing a collision or reaction cell with nitrogen, argon, or helium gas or a combination thereof; which includes said step of pressurizing the reaction region by metering the flow of said gas or gases into said collision cell and controlling the gas exiting the cell, maintaining a gas pressure in said cell in a pressure range of 1–100 torr;

d. receiving substantially all said gas-phase ions of interest from said ion source in a collision or reaction region in said collision cell, said gas-phase ions react or collide with said gas or gases in said collision region forming fragment gas-phase ionic and neutral chemical species;

e. providing electrostatic attraction to said gas-phase ions of interest and fragment gas-phase ionic chemical species in said reaction region with a direct current electrostatic field provided by funnel-well optics, said funnel-well optics comprised of a lens and an exit lens insulated from each other with a insulating base, having ion drawing direct current potentials such that said electrostatic attraction to said ions of interest and fragment gas-phase ionic species in said reaction region are concentrated at a small cross-sectional area on said exit lens so that substantially all said ions of interest and fragment ionic species are focused into an exit aperture in said exit lens, and;

f. transmitting substantially all said gas-phase fragment ionic chemical species and residual gas-phase ions of interest in said reaction region through said exit aperture into an analyzer chamber, whereby said gas-phase ionic chemical species and residual gas-phase ions of interest are analyzed by means of mass spectrometry or ion mobility.

13. A method of focusing and fragmenting gas-phase ions in a collision region, said ions from an ion source containing ions of interest for detection and analysis as claimed in claim 12, wherein said means of mass spectrometry is a quadrupole, time-of-flight, fourier transform mass spectrometer, linear quadrupole ion trap or a combination thereof.

14. A method of focusing and fragmenting gas-phase ions in a collision region, said ions from an ion source containing ions of interest for detection and analysis as claimed in claim 12, wherein said gas-phase ions of interest are produced at atmospheric or near atmospheric pressure.

15. A method of focusing and fragmenting gas-phase ions in a collision region, said ions from an ion source containing ions of interest for detection and analysis as claimed in claim 12, wherein said source of ions is mass spectrometer.

16. A method of focusing and fragmenting gas-phase ions in a collision or reaction region, said gas-phase ions from an ion source containing ions of interest for detection and analysis, said gas-phase ions of interest are molecular ions, fragment ions, cluster ions or a combination thereof, said method comprising:

a. providing electrostatic attraction to said gas-phase ions of interest from said ion source with electrostatic fields provided by an entrance lens, said entrance is a laminated lens comprised of an insulating base with metal laminates on the topside and underside of said base, having ion drawing direct current potentials, such that said electrostatic fields between said ion source and metal laminates are concentrated onto said metal laminate on topside of said insulating base of said laminated lens;

b. transmitting substantially all said gas-phase ions of interest from said ion source through said laminated lens allowing the unobstructed passage by providing a central opening in said laminated lens, said laminated lens having a low depth aspect ratio, a high openness aspect ratio, and a high electrostatic potential ratio between said metal laminates on the topside and underside of said laminated lens;

c. pressurizing a collision or reaction cell with nitrogen, argon, helium gas; air, or a combination thereof to a pressure of 1–100 torr; which includes pressurizing said reaction region by metering the flow of said gas or gases into said collision cell and controlling the gas exiting the cell;

d. receiving substantially all said gas-phase ions of interest from said ion source in a collision or reaction region in said collision cell, said gas-phase ions react or collide with said gas or gases in said collision region forming gas-phase fragment ions and neutral fragment species;

e. ionizing said gas-phase neutral fragment species by introducing gas-phase reagent ions generated externally to said reaction cell by means of discharge or chemical ionization;

f. providing electrostatic attraction to said gas-phase ions of interest and fragment ions in said reaction region with a direct current electrostatic field provided by funnel-well optics, said funnel-well optics is comprised of a lens and an exit lens insulated from each other with a insulating base, having ion drawing direct current potentials such that said electrostatic attraction to said ions of interest and fragment gas-phase ionic species in said reaction region are concentrated at a small cross-sectional area on said exit lens so that substantially all said ions of interest and fragment ionic species are focused into an exit aperture in said exit lens, and;

g. transmitting substantially all said gas-phase fragment ions and residual gas-phase ions of interest in said reaction region through said exit aperture into an analyzer chamber, whereby said gas-phase ionic chemical species and residual gas-phase ions of interest are analyzed by means of mass spectrometry or ion mobility.

17. A method of focusing and fragmenting gas-phase ions in a collision or reaction region, said gas-phase ions from an ion source containing ions of interest for detection and analysis as claimed in claim 16, wherein said gas-phase reagent ions are formed from methane, ammonia, air with residual amounts of water, or a combination thereof.

18. A method of focusing and fragmenting gas-phase ions in a reaction region, said gas-phase ions selected by a mass spectrometer containing ions of interest for detection and analysis, said ions of interest are positively charged ions or cluster ions, said method comprising:

a. providing electrostatic attraction to said positively charged cluster ions with electrostatic fields provided by an entrance lens, said entrance lens is a laminated lens comprised of an insulating base with metal laminates on the topside and underside of said base, having ion drawing direct current potentials, such that said electrostatic fields between said ion source and metal laminates are concentrated onto metal laminate on topside of insulating base of said laminated lens;

b. transmitting substantially all said positively charged cluster ions from said ion source through said laminated lens allowing the unobstructed passage by providing a central opening in said laminated lens, said laminated lens having a low depth aspect ratio, a high openness aspect ratio, and a high electrostatic potential ratio between said metal laminates on the topside and underside of said laminated lens;

c. receiving substantially all said positively charged cluster ions from said ion source in a reaction region, wherein said reaction region is pressurized to 1–100 torr;

d. forming electrons externally to said reaction region;

e. providing electrostatic attraction to said positively charged cluster ions in said reaction region and said externally generated electrons with direct current electrostatic fields provided by funnel-well optics, said funnel-well optics is comprised of a lens and an exit lens insulated from each other with an insulating base, having a positive ion and electron drawing direct current potentials such that said positive ions in said reaction region are accelerated towards and through a central openings in said lens towards said exit lens and said externally formed electrons are attracted to said exit lens from their said external source, transmitted into said reaction region through an aperture in said exit, reacting with said positive ions in said reaction region, forming positively charged fragment ion species; and;

f. transmitting substantially all said positively charged fragment ion species and any residual said positive ion dusters in said reaction region through said aperture in said exit lens into a analyzer chamber, whereby substantially all said gas-phase ionic positively charged fragment ion species and residual positive ions are analyzed in said analyzer chamber by means of a second mass spectrometer, such as, a quadrupole, time-of-flight, fourier transform mass spectrometer or combination thereof.

* * * * *